Figure 1:
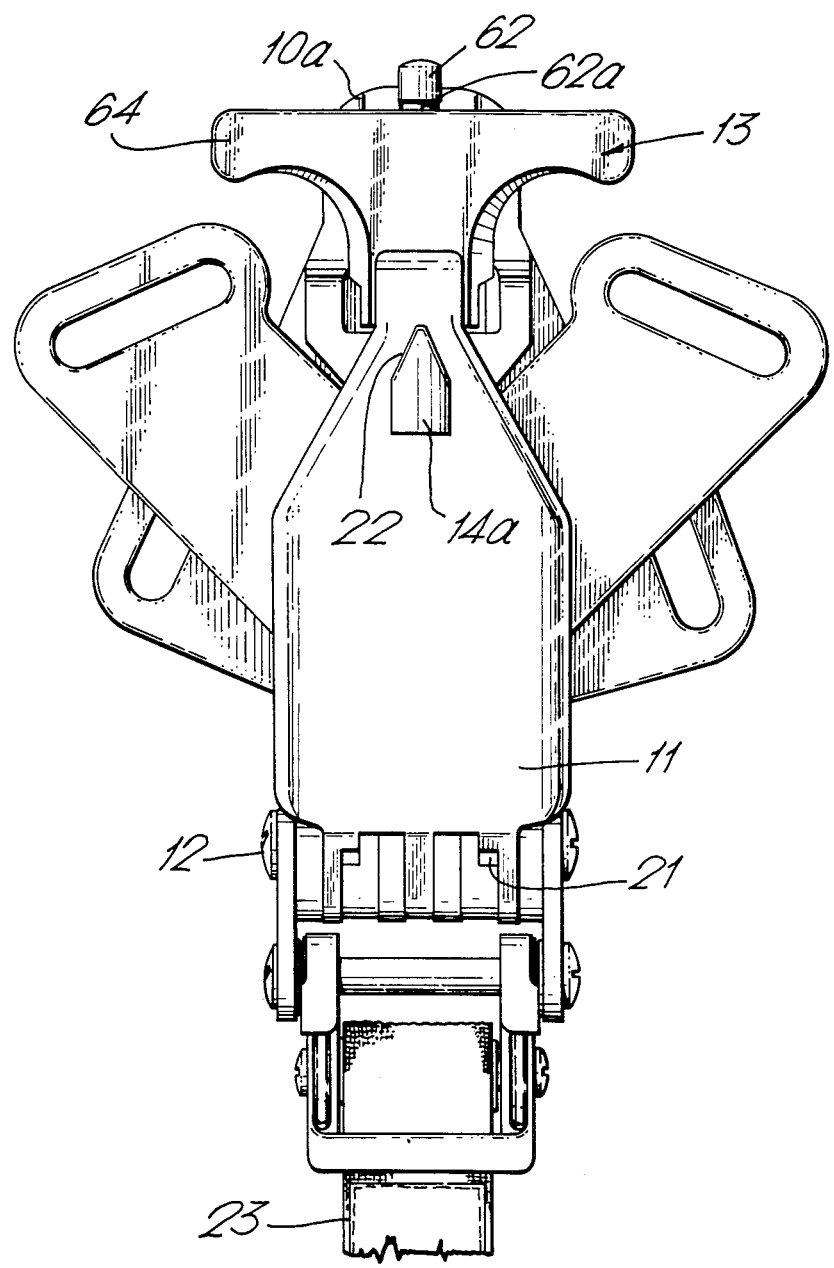

United States Patent [19]

Barwood

[11] Patent Number: 4,612,687
[45] Date of Patent: Sep. 23, 1986

[54] HARNESS FASTENERS

[75] Inventor: Anthony J. Barwood, Kings Lynn, England

[73] Assignee: The Secretary of State for Defence in Her Britannic Majesty's Government of the United Kingdom of Great Britain and Northern Ireland, London, England

[21] Appl. No.: 704,598

[22] Filed: Feb. 25, 1985

[30] Foreign Application Priority Data

Feb. 29, 1984 [GB] United Kingdom ............... 8405249

[51] Int. Cl.⁴ ............................................. A44B 11/25
[52] U.S. Cl. ...................................... 24/574; 24/589; 24/594; 24/602
[58] Field of Search ............... 24/574, 589, 594, 596, 24/602, 603; 244/122

[56] References Cited

U.S. PATENT DOCUMENTS

| | | | |
|---|---|---|---|
| 2,255,258 | 9/1941 | Lethern et al. | 24/574 |
| 2,461,785 | 2/1949 | Sullivan | 24/574 |
| 2,544,399 | 3/1951 | Schneider | 24/574 |
| 2,840,327 | 6/1958 | Stanley | 24/574 |
| 3,404,439 | 10/1968 | Jones et al. | 24/603 |
| 3,825,979 | 7/1974 | Jakob | 24/574 |
| 4,014,080 | 3/1977 | Caradec | 24/602 |
| 4,441,236 | 4/1984 | Bron | 24/602 |

FOREIGN PATENT DOCUMENTS 2242047  3/1975  France .

Primary Examiner—Victor N. Sakran
Attorney, Agent, or Firm—William R. Hinds

[57]  ABSTRACT

A quick release fastener (QRF) for a restraint harness the fastener having a base plate with a lug retainer boss projecting therefrom, a cover plate hinged to the base plate and recessed to receive the free end of the boss, and a lock for locking the cover plate to the base. The lock requires two directionally different operations to open same and may incorporate an intermediate closure device for holding the fastener in a lug-loading configuration.

13 Claims, 7 Drawing Figures

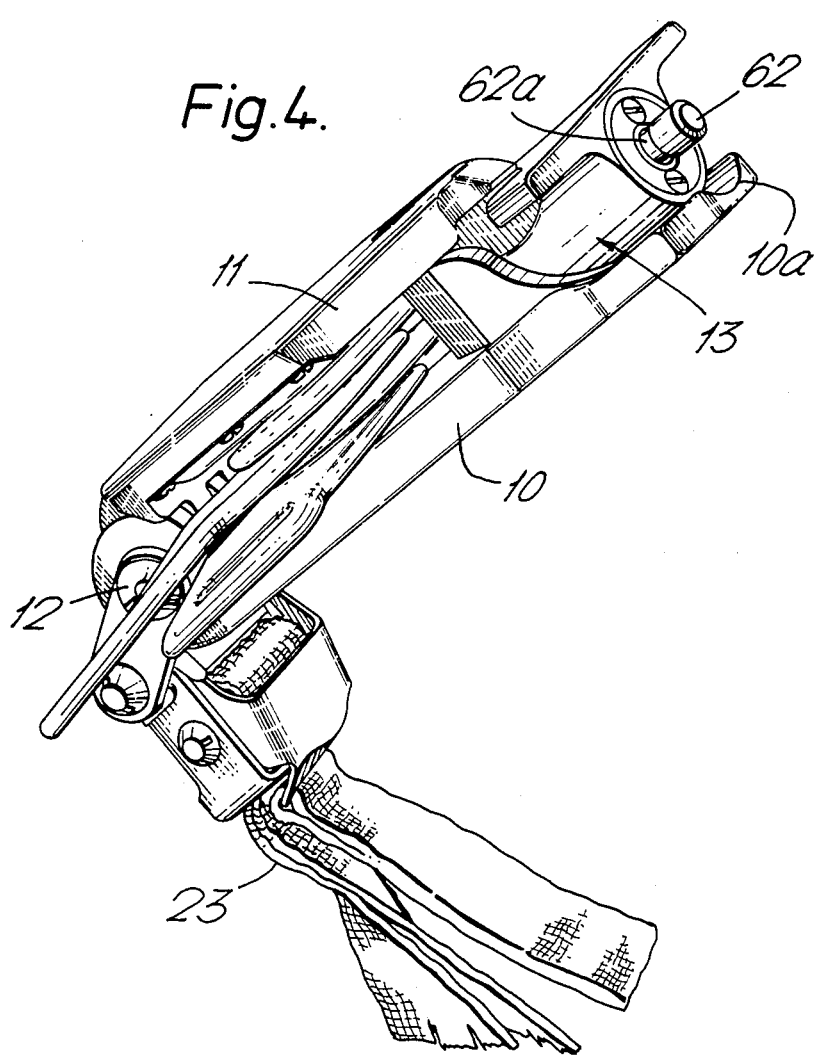

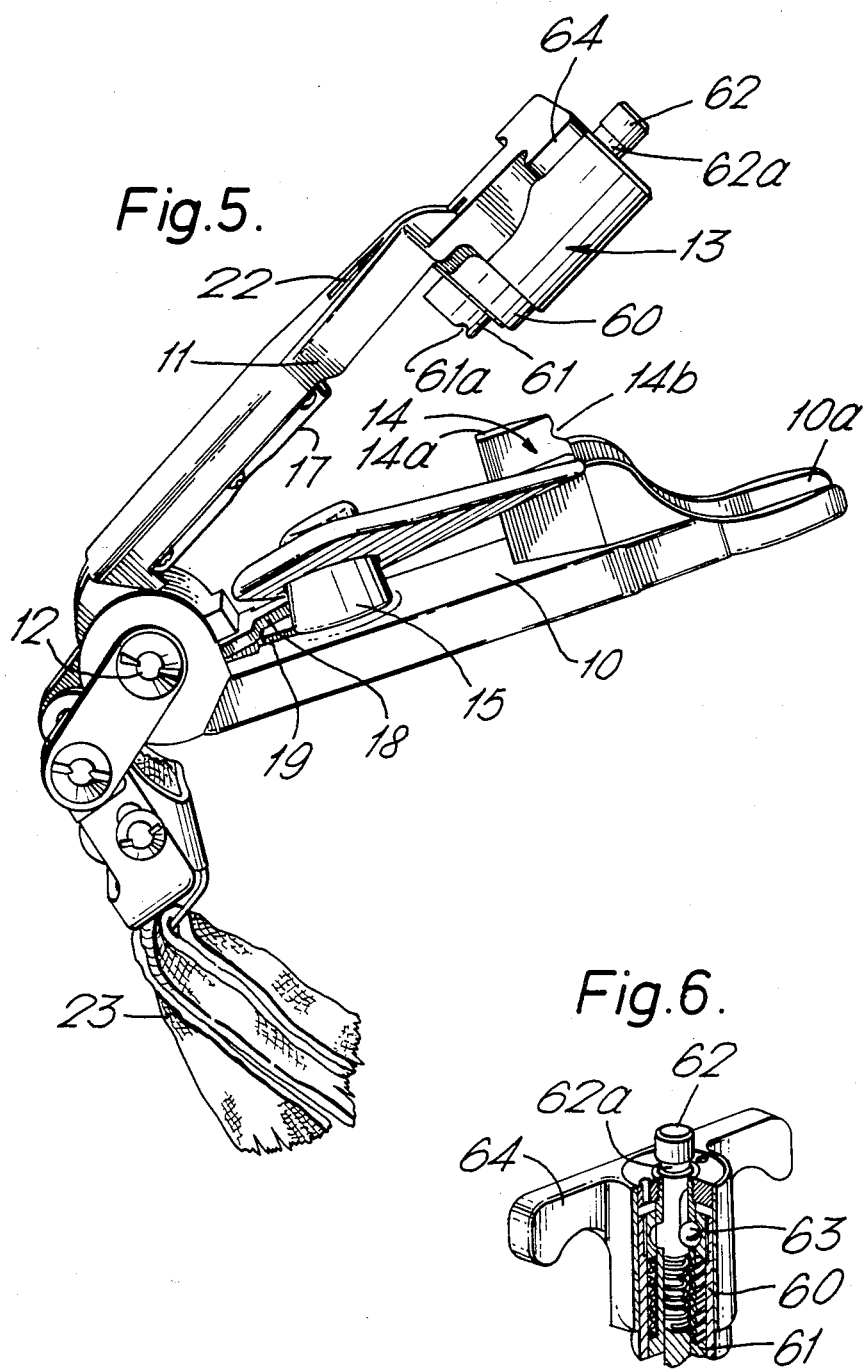

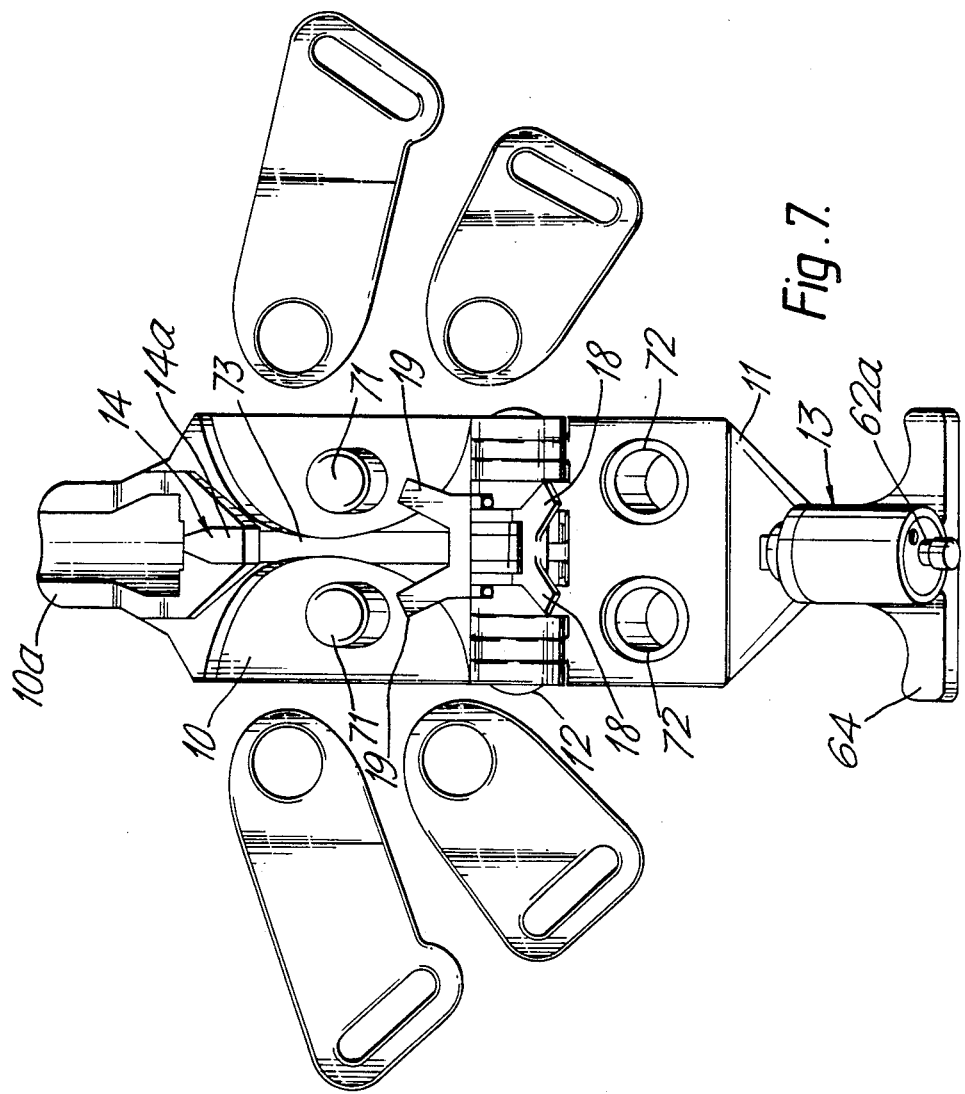

HARNESS FASTENERS

The present invention relates to harness fasteners. It is particularly concerned with fasteners for parachute harnesses.

A parachute harness fastener well known in the art is the quick release fastener (QRF), also known as the quick release box (QRB). Typically such a fastener is permanently attached via a strap to an ejection seat, and is arranged releasably to secure together four or more harness straps in individual harness lug holders. Release of all the straps simultaneously is achieved by turning and pressing a face plate on the fastener, a means which has been generally successful in preventing inadvertent releases, be they as a result of accidental equipment or personal interference or inertia forces.

In the quest for total prevention of inadvertent releases quick release fasteners have become unserviceable due to part failure, particle ingress and corrosion.

The present invention provides a simple quick release fastener for parachute harnesses in which the number of parts has been minimised without compromising the prevention of inadvertent release.

According to the present invention a quick release fastener for a harness comprises a base plate with a lug retainer boss projecting therefrom, a cover plate pivotally connected to the base plate and arranged when in a locked configuration to seal the free end of the lug retainer boss, and releasable lock means for retaining the cover plate in the locked configuration.

The present invention shows several advantages over the known systems, one of which is its of simpler construction, which should result in increased reliability of operation as well as lower initial costs. Fasteners of the type used particularly for parachute harnesses and aircrew harness are complex by virtue of the need to individually lock each lug in the fastener. The use of a single boss, or a pair of bosses onto which a plurality of lugs may be loaded reduces the number of complex locking mechanisms required.

According to an important feature of the invention the fastener may be arranged to have a semi-closed configuration in which the cover is held just clear of the lug retainer boss to allow the loading of lugs onto the boss. To this end the lock may incorporate intermediate closure means and the cover spring means for retaining lugs on the boss during loading in the semi-closed configuration.

According to a feature of the invention, the releasable lock means may be one which requires both of at least two different directions of manual operation to effect release, for example the lock means may incorporate operators in the form of a button pressable by say a thumb, and a handle pullable by fingers, it being perhaps impossible so to pull the handle until the button has been pressed. The fastener preferably incorporates a guard for protecting the lock means against inadvertent operation, eg restricting access to the lock operators to such fingers. Also the lock operators are preferably mounted on the cover so as to be available for lifting the cover away from the base.

Fasteners according to the present invention require two different simultaneous manual operations to effect release of the catch, and a further manual operation to fully open the cover and eject any harness lugs on the boss.

According to another feature of the invention the fastener may have a harness lug ejector. This may be associated with the hinge between the cover and the base and arranged to lift the lugs once the cover has opened beyond the semi closed configuration. The boss preferably has the shape of a truncated cone, to assist lug release, and its free end is so shaped with respect to the semi closed configuration as to assist loading of the lugs. Preferably the cover is recessed to receive the free end of the boss.

Advantageously the boss is located intermediate the locking means and the hinge, and in the region of the locking means the fastener has an indicator co-operating with the cover for indicating serviceability and full locking.

The fasteners according to this invention may be provided with two bosses in spaced apart relationship, the cover plate may thus be provided with two recesses, each adapted to receive one boss.

An advantage of this invention is that the whole fastener assembly may be made thinner than an equivalent known system and the use of two bosses instead of one enables the fastener to be made yet thinner still for the capability to accept a given number of harness lugs, or to accept a greater number of harness lugs for the same thickness of fastener.

The fastener may incorporate spring means, perhaps at the hinge, urging the cover and the base apart.

Figure 2:
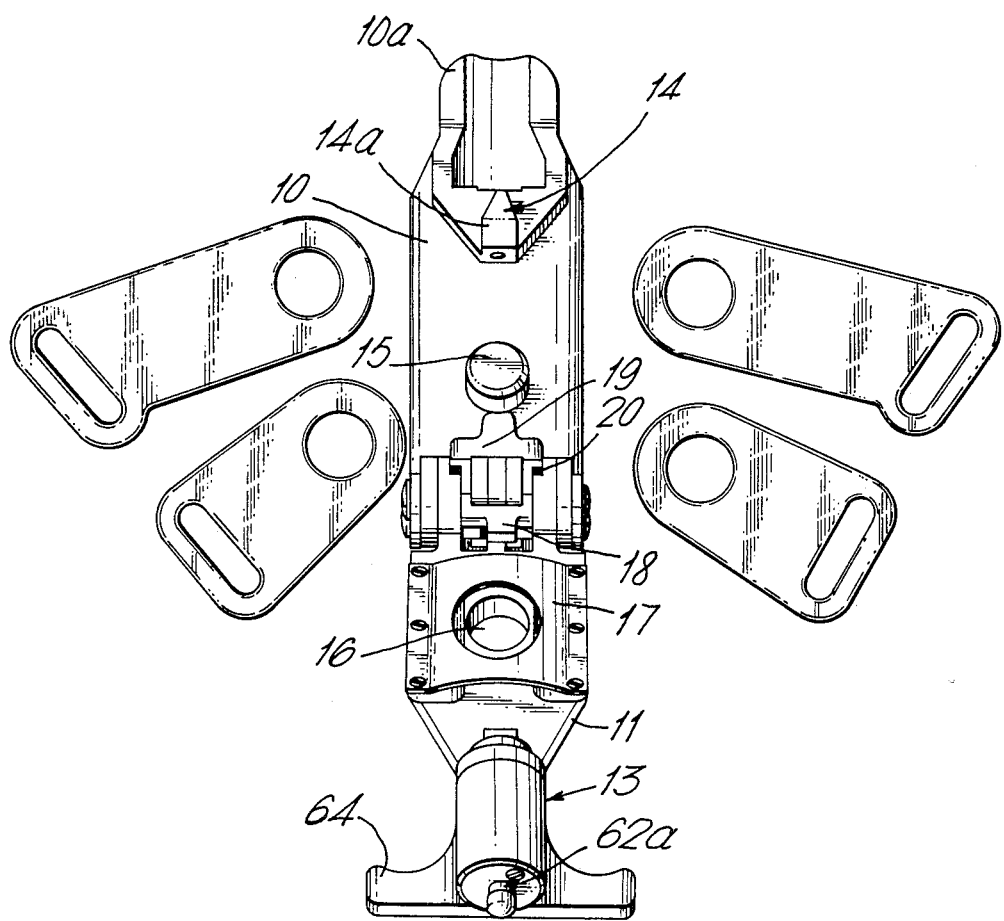
Figure 3:
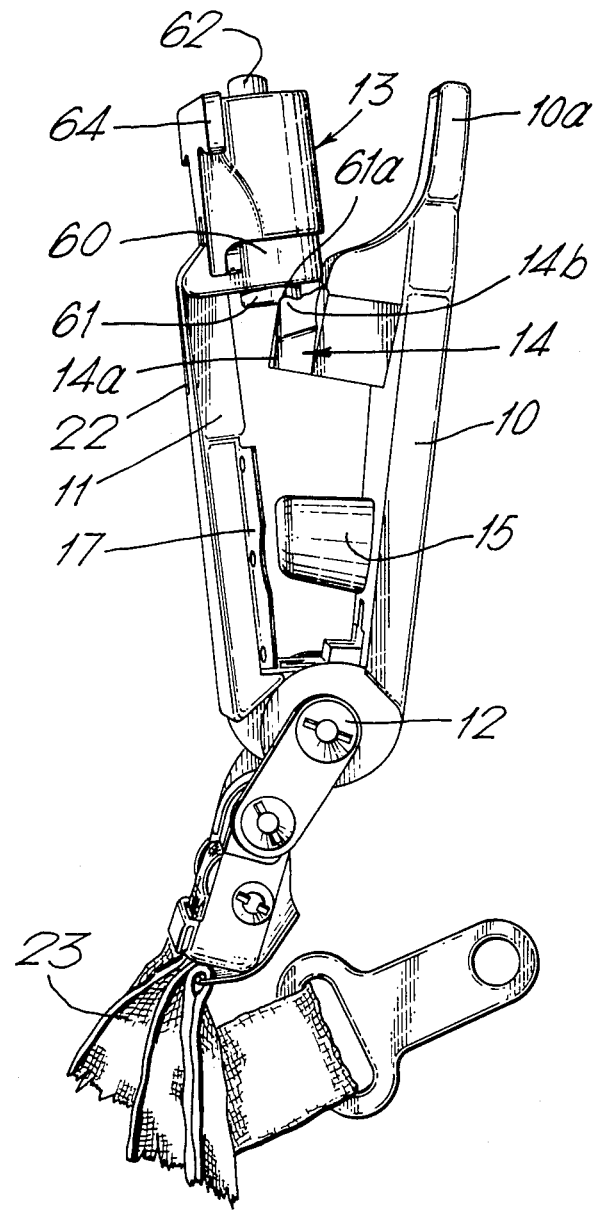

A parachute harness fastener in accordance with the present invention will now be described by way of example, with reference to the accompanying drawings, of which FIG. 1 is a plan view of the fastener with four lugs and in a closed configuration, FIG. 2 is a view of the fastener with four lugs and in an open configuration, FIG. 3 is a side view of the fastener in a semi-closed, loading, configuration, FIG. 4 is a side view of the fastener with four lugs in a closed configuration, FIG. 5 is a side view of the fastener in open configuration, FIG. 6 is a part sectional view of a releasable lock, and FIG. 7 is a plan view of an alternative embodiment showing the fastener in the open position and having two harness lug retaining bosses.

The fastener shown in the drawing has a base plate 10 and a cover plate 11 attached to the base 10 by a hinge 12. At an end of the plates remote from the hinge 12 is a releasable lock 13 on the cover plate 11 and a catch member 14 on the base plate 10. Intermediate the hinge and the lock the base plate 10 carries a lug retainer cone 15, and the cover plate 11 has a corresponding cone end receiving recess 16. Surrounding the recess 16 a spring plate 17 projects from the cover plate 11.

The hinge 12 also carries a lug ejector 18, and the base plate 10 a recess 19 for receiving the ejector 18. Spring 20 and stop 21 means, operative between the ejector 18 and the cover 11, ensure a certain angular displacement of the ejector 18 from the cover plate 11, unless the fastener is semi-closed to closed when the ejector 18 lies in the recess 19.

The releasable lock 13 is particularly illustrated in FIG. 6. It comprises a cylindrical housing 60 by which the lock 13 is mounted on the cover 11, a spring loaded locking plunger 61 within the housing 60, a spring-loaded thumb button 62 within the plunger 61, and detent means 63 operable between the button 62, the plunger 61 and the housing 60, and a handle 64 outside the housing 60 but attached to the plunger 61. The button 62 has a circumferential indicator groove 62a at a base location theron. The button 62 is spring-loaded outward (rearward) of the plunger 61, and the plunger 61 is spring-loaded with respect to the housing 60 towards a closed configuration. The catch member 14 has a recess for positive close fitting reception of the plunger 61.

The plunger 61 has a semi-close catchment groove 61a at its catchment end, and the catch member 14 on the base 10, see particularly FIGS. 3 and 5, has, on an indicator nose 14a, a corresponding projection 14b. A hole 22 through the cover 11 receives the nose 14a when the fastener is closed and, this hole being close-fitting, provides positive location and one indication that the fastener is safe to use and fully closed. The base 10 extends beyond the button 62 to form a guard against both inadvertent operation and obstruction. The fastener is arranged for anchorage via a strap 23 attached to the hinge 12.

In operation of the fastener as attached via a strap 23 to an aircraft ejection seat, the aircrewman, having located the fastener with the base 10 thereof adjacent the front of his torso places it in a semi-closed configuration illustrated in FIG. 3. In this configuration the groove 61a on the plunger 61 has engaged the nose 14b, the plunger 61 is spring-loaded to retain that configuration, the spring plate 17 clears the free end of the cone 15 by a distance slightly less than the thickness of the harness lugs, and the ejector 18 lies in the recess 19. The aircrewman may then load his harness lugs into the fastener one at a time, pushing them between the free end of the cone 15 and the spring 17 until they engage over the cone. It will be noted from FIG. 3 that the plunger 61 is not fully extended in the semi-closed configuration, and the button 62 not fully out, so that the detent means 63 are not in engagement. Hence in order fully to close the fastener after loading it is sufficient to press the cover 11 and the box 10 together, when the plunger 61 will fully engage its recess in the catchment 14, the detent means 63 will engage and the button 62 emerge to show the indicator groove 62a.

In the fully closed configuration as illustrated in FIGS. 1 and 4, the outer face of the nose 14a will be flush with the outer face of the cover 11, through the hole 22, and the free end of the cone will be engaged in the recess 16, so that the harness lugs (four are shown in the Figures) will all be firmly held on the cone 15 between the base 10 and the cover 11. The guard 10a renders practically impossible an inadvertent depression of the button 62 and pulling of the handle 64.

In order to open the fastener the button 62 is pressed, permitting detent means 63 to release the plunger 61 from immobility with respect to the housing 60. The handle 64 is then pulled and brings with it the plunger 61. When the plunger is free of the catch member 14 the cover 11 can swing away from the base 10. When it has swung past the semi-closed configuration the ejector 18 leaves the recess 19 and levers the lugs off the cone 15.

An alternative embodiment is illustrated in FIG. 7. The figure shows a plan view of the fastener in the open position, the base plate 10 carries two harness lug retaining bosses 71. Each boss is adapted to engage in boss receiving recess 72 in the cover plate 11. The bosses are not necessarily conical but may be for example cylindrical and provided with shoulders upon which the cover plate 11 rests when in the locked position. Conveniently a ridge 73 may be provided and arranged to run along the base plate between the two bosses, the ridge may be shaped conveniently to guide the lugs towards bosses when the assembly is in the semi closed position and the lugs are being fitted on the bosses. The assembly is also provided with twin harness lug ejectors 19, one ejector acting to eject lugs from each of the bosses. The lug ejectors operate in the manner described.

The spring plate on the cover plate could be replaced by a rubber block or other resilient material, and in the embodiment of this invention having two bosses the rubber block or resilient element may be slightly wedge shaped or contoured to have a ridged high point running along the cover plate between the two bosses, and in a position in which it will contact ridge 73 when in the closed or semi closed configuration.

The fasteners hereinbefore described are but two examples of fasteners in accordance with the present invention, and other contributions are possible without departing from the scope thereof. In particular the lock may have a different construction. The lock construction proposed above is particularly suitable since it already meets the requirements of non-inadvertent operation either by the wearer of the harness or as a result of the high impulse forces to which harnesses are often subjected. In another lock the button may be arranged for transverse operation, or release of a detent means may be obtained in a rotary device. Again, the fastener is described as a parachute fastener and arranged to hold four lugs. The fastener may be used with any restraint harness, for example a personal seat restraint harness in a racing vehicle or craft. A reasonable maximum number of lugs that such a fastener might accept is six.

I claim:

1. A quick release fastener for use in conjunction with a harness system having,
   a base plate,
   a harness lug retaining boss protruding therefrom,
   a cover plate for covering the base plate,
   said cover plate being pivotally connected to said base plate and moveable between locked and unlocked positions,
   said cover plate when in the locked position being arranged to cover the free end of the boss so as to prevent harness lugs from being dislodged from the retaining boss, and releasable locking means for releasably holding the cover plate to the base plate over the free end of the boss, said releasable locking means including means requiring at least two different simultaneous directions of movement to effect release of the locking means.

2. A quick release fastener according to claim 1 wherein the locking means has a plunger and retaining catch means, the plunger and retaining means having intermediate positions to allow the cover plate to be held in a semi-closed position to permit the loading of harness lugs onto the lug retaining boss.

3. A quick release fastener according to claim 2 wherein the fastener is provided with a harness lug ejector, the harness lug ejector being in the form of a lever means associated with a hinge assembly connecting the base plate to the cover plate, said harness lug ejector only operating when the hinge is opened beyond the semi closed position.

4. A quick release fastener according to claim 2 wherein there is provided in the region of locking means and retaining catch means an indicator for indicating when the fastener is in the fully locked position.

5. A quick release fastener according to claim 1 wherein said cover plate is connected by hinge means to the base plate, the cover plate being arranged to contact the free end of the boss when in the locked position.

6. A quick release fastener according to claim 1 in which the boss is of circular cross-section and the cover plate is provided with a recess to receive the free end of the boss.

7. A quick release fastener according to claim 1 wherein the base plate supports retaining catch means for the locking means, the cover plate connected to the base plate supports the locking means, and the locking means and catch means have intermediate latching positions to permit the cover plate to be held in a semi-closed position.

8. A quick release fastener for use in conjunction with a harness system having,
   a base plate,
   at least two harness retaining lug bosses protruding therefrom,
   a cover plate for covering the base plate,
   said cover plate being pivotally connected to said base plate and moveable between locked and unlocked positions,
   said cover plate when in the locked position being arranged to cover the free ends of the bosses so as to prevent the harness lugs from being dislodged from the retaining bosses, and releasable locking means for releasably holding the cover plate to the base plate over the free ends of the bosses, said releasable locking means including means requiring at least two different simultaneous directions of movement to effect release of the locking means.

9. A quick release fastener according to claim 8 wherein the cover plate is connected by hinge means to the base plate, the cover plate being arranged to contact the free ends of the bosses when in the locked position.

10. A quick release fastener according to claim 8 in which the bosses are of circular cross-section and in which the cover plate is provided with recesses, each recess being adapted to receive the free end of a boss.

11. A quick release fastener according to claim 8 wherein the locking means has a plunger and retaining catch means, the plunger and retaining catch means having intermediate positions to allow the cover plate to be held in a semi-closed position to permit the loading of harness lugs onto the lug retaining boss.

12. A quick release fastener according to claim 12 wherein the fastener is provided with harness lug ejectors, the harness lug ejectors being in the form of lever means associated with a hinge assembly connecting the base plate and cover plate, said harness lug ejectors adapted to eject harness lugs on each of the lug retaining bosses and only operating when the hinge is opened beyond the semi-closed position.

13. A quick release fastener according to claim 11 wherein there is provided in the region of locking means and retaining catch an indicator for indicating when the fastener is in the fully locked position.

* * * * *